US010286522B2

(12) United States Patent
Inui et al.

(10) Patent No.: US 10,286,522 B2
(45) Date of Patent: May 14, 2019

(54) RECOVERY METHOD FOR ABRASIVE (71) Applicant: Konica Minolta, Inc., Tokyo (JP)

(72) Inventors: Chie Inui, Hino (JP); Akihiro Maezawa, Hino (JP); Yuuki Nagai, Tachikawa (JP); Natsumi Hirayama, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/556,910

(22) PCT Filed: Mar. 9, 2016

(86) PCT No.: PCT/JP2016/057293
§ 371 (c)(1),
(2) Date: Sep. 8, 2017

(87) PCT Pub. No.: WO2016/147968
PCT Pub. Date: Sep. 22, 2016

(65) Prior Publication Data
US 2018/0056483 A1    Mar. 1, 2018

(30) Foreign Application Priority Data

Mar. 19, 2015 (JP) ................. 2015-055772

(51) Int. Cl.
*B24B 37/02* (2012.01)
*B24B 37/24* (2012.01)
(Continued)

(52) U.S. Cl.
CPC .............. *B24B 57/00* (2013.01); *B24B 37/02* (2013.01); *B24B 37/24* (2013.01); *B24B 37/34* (2013.01); *B24B 57/02* (2013.01)

(58) Field of Classification Search
CPC ................................ B24B 37/34; B24B 57/00
(Continued)

(56) References Cited

U.S. PATENT DOCUMENTS

| 5,830,369 A * | 11/1998 | Toyama ................. B28D 1/025 210/773 |
| 2008/0250723 A1* | 10/2008 | Fragiacomo ............. B01D 3/00 51/298 |
| 2009/0298393 A1* | 12/2009 | Kozasa ..................... B24B 1/04 451/41 |

FOREIGN PATENT DOCUMENTS

| EP | 0968801 A1 * | 1/2000 | ......... B01D 21/0012 |
| JP | H06-254764 A | 9/1994 | |

(Continued)

OTHER PUBLICATIONS

International Preliminary Report on Patentability dated May 10, 2016 corresponding International Application No. PCT/JP2016/057293 and English translation.
(Continued)

*Primary Examiner* — Terrell H Matthews
(74) *Attorney, Agent, or Firm* — Lucas & Mercanti, LLP (57) ABSTRACT

A method for collecting an abrasive from an abrasive slurry which has been used for polishing an object including silicon as a main component includes: (i) adding a solvent to the abrasive slurry; (ii) dissolving particles of the polished object among components of the polished object contained in the abrasive slurry; and (iii) filtering the abrasive slurry to collect the abrasive, in which the steps (i) to (iii) are carried out without a pH adjuster to remove components of the polished object to collect the abrasive.

8 Claims, 2 Drawing Sheets

(51) Int. Cl.
*B24B 37/34* (2012.01)
*B24B 57/00* (2006.01)
*B24B 57/02* (2006.01)

(58) Field of Classification Search
USPC .............................................. 209/11; 51/298
See application file for complete search history.

(56) References Cited

FOREIGN PATENT DOCUMENTS

| | | | | |
|---|---|---|---|---|
| JP | 2002016027 A | 1/2002 | | |
| JP | 2002519209 A | 7/2002 | | |
| JP | 2003205460 A | 7/2003 | | |
| JP | 2008-124213 A | 5/2008 | | |
| WO | WO-0001519 A1 | * | 1/2000 | ......... B01D 21/0012 |

OTHER PUBLICATIONS

Japanese Office Action for corresponding Application No. 2015-055772 dated Aug. 3, 2015 and English translation.
International Search Report dated May 10, 2016 for PCT/JP2016/057293 and English translation.
Office Action dated Oct. 22, 2018 from the corresponding Chinese Patent Application No. 201680016348.7 and English translation.

* cited by examiner

RECOVERY METHOD FOR ABRASIVE

CROSS REFERENCE TO RELATED APPLICATION

This Application is a 371 of PCT/JP2016/057293 filed on Mar. 9, 2016, which, in turn, claimed the priority of Japanese Patent Application No. 2015-055772 filed on Mar. 19, 2015, both applications are incorporated herein by reference.

TECHNOLOGICAL FIELD

The present invention relates to a method for collecting an abrasive. In particular, it relates to a method for collecting an abrasive in which a highly pure abrasive is collected by dissolving components of a polished object in a solvent.

BACKGROUND

As an abrasive for finely polishing an optical glass and a crystal radiator in a finishing process, highly hard particles, such as diamond, boron nitride, silicon carbide, alumina, alumina-zirconia, zirconium oxide and cerium oxide, have been used.

Since these abrasives are hard particles, they are used in large quantities as an optical abrasive for a mirror finish of electronic parts, such as an optical lens, a semiconductor silicon substrate, a crystal wafer and a glass plate of a liquid crystal screen.

CMP (Chemical Mechanical Polishing) is applied as a method for polishing. In CMP, polishing is carried out in a state where an abrasive slurry lies between a polished object and an abrasive member such as an abrasive pad.

When a polished object contained in an abrasive slurry is increased through polishing, the finishing efficiency falls. Therefore, such an abrasive slurry will be disposed.

Some of the main components of an abrasive is obtained from minerals that are not produced in Japan, and thus partially relies on imported materials. In addition, many of the main components of an abrasive are expensive, and an abrasive is used in large quantities. Thus an abrasives is important and is one of resources that are eagerly desired to be reused.

In collection of an abrasive, it is important to remove components derived from a polished object from a collected slurry. For example, Patent Documents 1 and 2 disclose a method in which a dispersing agent or an electrolyte is added to dissolve components derived from a polished object.

However, these methods have a problem that foreign substances are likely to get mixed in a collected slurry, which decreases purity.

PRIOR ART DOCUMENT

Patent Document

Patent Document 1: JP 2003-205460 A
Patent Document 2: JP H6-254764 A

SUMMARY

Problems to be Solved by the Invention

The present invention is made in view of the above problems. An object of the present invention is to provide a simple method for collecting a highly pure abrasive from a collected slurry that contains a used abrasive.

Means for Solving Problems

In order to solve the above problem, the present inventors investigated the cause, etc. of the problem. Through the investigation, the inventors found a method for collecting an abrasive from an abrasive slurry which has been used for polishing an object including silicon as a main component, the method at least comprising: (i) adding a solvent to the abrasive slurry; (ii) dissolving particles of the polished object among components of the polished object contained in the abrasive slurry; and (iii) filtering the abrasive slurry to collect the abrasive. The steps (i) to (iii) are carried out without a pH adjuster to remove components of the polished object to collect the abrasive. It achieves a simple method for collecting a highly pure abrasive from a collected slurry that contains a used abrasive. The present invention has been thus made.

That is, the above object of the present invention is accomplished by the following ways.

1. A method for collecting an abrasive from an abrasive slurry which has been used for polishing an object including silicon as a main component, the method at least comprising:
   (i) adding a solvent to the abrasive slurry;
   (ii) dissolving particles of the polished object among components of the polished object contained in the abrasive slurry; and
   (iii) filtering the abrasive slurry to collect the abrasive,
   wherein the steps (i) to (iii) are carried out without a pH adjuster to remove components of the polished object to collect the abrasive.

2. The method according to the item 1, wherein an amount of the solvent added in the steps (i) and (ii) is adjusted in accordance with a concentration of the components of the polished object contained in the abrasive slurry.

3. The method according to the item 2, wherein the solvent is added to the abrasive slurry so that the concentration of the components of the polished object becomes, at the most, 1.8 times a saturation solubility of the polished object.

4. The method according to any one of the items 1 to 3, wherein, in the step (ii), heating is carried out after the solvent is added to the abrasive slurry.

5. The method according to the item 4, wherein the heating is carried out so that a temperature of the abrasive slurry comes within a range between 40° C. and 90° C.

Effects of the Invention

The above means of the present invention provide a simple method for collecting a highly pure abrasive from a collected slurry that contains a used abrasive.

The mechanisms of the above effect of the present invention are not definitively revealed, but the following reasoning can be made.

In the method for collecting an abrasive according to the present invention, a solvent is added to a collected slurry that contains a used abrasive, and thereby particles of a polished object in aggregated components of the polished object are dissolved. Thus a highly pure abrasive is collected in a simple method without a pH adjuster.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

EMBODIMENTS FOR CARRYING OUT THE INVENTION

Hereinafter, one or more embodiments of the present invention will be described with reference to the drawings. However, the scope of the invention is not limited to the disclosed embodiments.

The present invention is a method for collecting an abrasive from an abrasive slurry which has been used for polishing an object including silicon as a main component, the method at least comprising:

(i) adding a solvent to the abrasive slurry;

(ii) dissolving particles of the polished object among components of the polished object contained in the abrasive slurry; and (iii) filtering the abrasive slurry to collect the abrasive, wherein the steps (i) to (iii) are carried out without a pH adjuster to remove components of the polished object to collect the abrasive.

In order to achieve effect of the invention, preferably, an amount of the solvent added in the steps (i) and (ii) is adjusted in accordance with a concentration of the components of the polished object contained in the abrasive slurry.

In order to achieve effect of the invention, preferably, the solvent is added to the abrasive slurry so that the concentration of the components of the polished object becomes, at the most, 1.8 times a saturation solubility of the polished object.

In order to achieve effect of the invention, preferably, in the step (ii), heating is carried out after the solvent is added to the abrasive slurry.

In order to achieve effect of the invention, preferably, the heating is carried out so that a temperature of the abrasive slurry comes within a range between 40° C. and 90° C.

Hereinafter the present invention and the components thereof, and embodiments for carrying out the present invention will be described in detail. As used herein, "to" is intended to mean that the numerical values before and after "to" are included as the lower and upper limits.
Summary of Method for Collecting Abrasive The present invention is a method for collecting an abrasive from an abrasive slurry which has been used for polishing an object including silicon as a main component, the method at least comprising:

(i) adding a solvent to the abrasive slurry;

(ii) dissolving particles of the polished object among components of the polished object contained in the abrasive slurry; and (iii) filtering the abrasive slurry to collect the abrasive, wherein the steps (i) to (iii) are carried out without a pH adjuster to remove components of the polished object to collect the abrasive.

More specifically, according to the method of the present invention for collecting an abrasive, after a glass, etc. is polished with an abrasive slurry in a polish process, a slurry containing a used abrasive (hereinafter referred to as a collected slurry) is collected with wash liquid. Then a solvent is added to the collected slurry, and particles of a polished object are dissolved. After that, the collected slurry is filtered and an abrasive is collected.

The process 1 of adding a solvent to an abrasive slurry may be carried out, not only before the solution process 2, but also in the filtration process.

Components of a polished object in the present invention mean components derived from the polished object, such as an ion of an element of the polished object, a compound of elements, an ion of a compound. They include particles of the polished object, etc.

Figure 1:
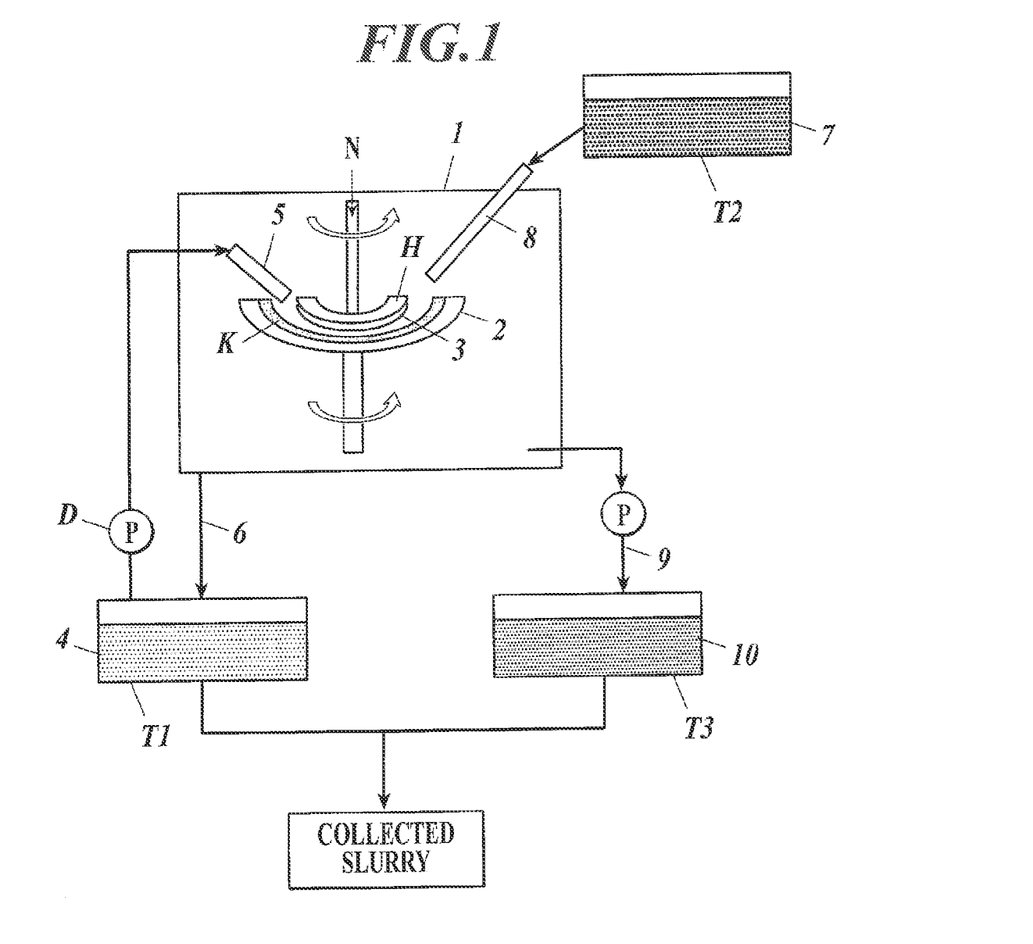
FIG. 1 is a schematic diagram illustrating an example of a flow chart of a used abrasive slurry discharged in a polish process.

First, explanation referring to FIG. 1 begins with a polish process of a polished object and ends with collection of a slurry containing a used abrasive (collected slurry).
Polish Process Taking polishing of a glass lens as an example, a polish process is normally composed of preparing an abrasive slurry, polishing and washing of a polish portion.

In a polish process illustrated in FIG. 1, an abrader 1 includes an abrasive surface plate 2 on which an abrasive cloth K composed of a non-woven cloth, synthetic resin foam or synthetic leather is adhered. The abrasive surface plate 2 is rotatable. In polishing, the abrasive surface plate 2 and a rotatable holder H is rotated while an object 3 to be polished which is mainly composed of silicon is pushed against the abrasive surface plate 2 with a predetermined pressure force N by the holder H. Simultaneously, an abrasive liquid 4 (abrasive slurry) which is prepared in advance is supplied through a slurry nozzle 5 using a pump D. The used abrasive liquid 4 (slurry containing a used abrasive) passes through a flow pass 6 and is then put and pooled in a slurry tank T1. The abrasive liquid 4 is repeatedly circulated through the abrader 1 and the slurry tank T1.

Wash water 7 for washing the abrader 1 is pooled in a wash water tank T2. Wash water 7 is sprayed through a wash water-spraying nozzle 8 to a polish portion, and then, as abrasive-containing wash liquid 10 (slurry containing a used abrasive), passes through a flow pass 9 using a pump and is put and pooled in a wash liquid tank T3. The wash liquid tank T3 is used for pooling the wash liquid that was used in the washing (rinsing). The pooled liquid in the wash liquid tank T3 is continuously stirred using a stirring blade to avoid sedimentation and aggregation.

The abrasive liquid 4 that is caused by polishing, pooled in the slurry tank T1 and then repeatedly circulated and used and the abrasive-containing wash liquid 10 that is pooled in the wash liquid tank T3 both contain not only particles of abrasive but also a glass component, etc. removed from the polished object 3 which is polished.

Specific method in the polish process will be explained.

(1) Preparation of Abrasive slurry

Powder of an abrasive is added in an amount of 1 to 40% by mass to a solvent such as water and then dispersed in the solvent to obtain an abrasive slurry. This abrasive slurry is circulated through an abrader 1 and used as illustrated in FIG. 1. The particles used as the abrasive have an average size ranging from several dozen nanometers to several micrometers.

(2) Polish

As illustrated in FIG. 1, the object 3 to be polished is brought into contact with the abrasive pad (abrasive cloth K). The glass substrate 3 and the abrasive pad K are moved relative to each other under pressure force while the abrasive slurry is supplied to the contacting face.

When the polishing is finished, a large quantity of the abrasive is present on the polished object 3 and the abrader 1. Thus, water or the like is supplied in place of the abrasive slurry after the polishing to wash the abrasive to remove it from the polished object 3 and the abrader 1. Then, the abrasive-containing wash liquid 10 is discharged to the flow pass 9.

As a result of the washing, a certain amount of the abrasive is discharged to the flow pass 9 of the polish system, and thus the amount of the abrasive in the polish system is reduced. To make up for this reduction, a fresh abrasive slurry is newly supplied to the slurry tank T1. The addition may be carried out after every single polish process or after every predetermined times of repeated polish process.

Used Abrasive Slurry

In the present invention, the used abrasive slurry means the abrasive slurry pooled in the wash liquid tank T3 and the abrasive slurry discharged to the outside of the system including the abrader 1, the slurry tank T1 and the wash water tank T2, and is categorized mainly into the following two types.

One is an abrasive slurry which contains the wash liquid discharged in the washing process and is pooled in the wash liquid tank T3 (a rinse slurry). The other is an abrasive slurry that was used and is pooled in the slurry tank T1, and that is disposed after use for a certain number of times of polishing (a life-ended slurry).

The rinse slurry which contains the wash water is characterized by the following two features.

1) This slurry is discharged in the washing. Thus, this slurry contains a large amount of the wash water and the concentration of the abrasive in this slurry is drastically lower than that of the abrasive slurry in the system in the polish process.

2) The glass component which was present on the abrasive cloth K or the like is included in the rinse slurry as a result of the washing.

On the other hand, the life-ended slurry is characterized in that the concentration of the glass component is higher than that of a fresh abrasive slurry.

The used abrasive slurry in the example is made by mixing a used abrasive slurry pooled in the slurry tank T1 (life-ended slurry) with the abrasive slurry pooled in wash liquid tank T3 and by ten-minute stirring.

Slurry Collection Process

The slurry collection process is a step in which the abrasive slurry including a used slurry is collected.

As mentioned above, in the slurry collection process, one or both of the rinse slurry and the life-ended slurry are collected.

The concentration of the abrasive in the collected abrasive slurry (collected slurry) is about 0.1 to 40% by mass.

Next, we explain the method of the present invention for collecting an abrasive.

Method for Collecting Abrasive

The method of the present invention for collecting a used abrasive includes at least a solvent addition process, a solution process and a filtration process. Preferably, the method further includes a foreign substance removal process and a concentration process. More preferably, the solution process and the filtration process are repeated after the filtration process, and then the concentration process is carried out. If necessary, operation (process) of adding a solvent may be carried out in the foreign substance removal process, the solution process and/or the filtration process.

Foreign Substance Removal Process

An abrasive slurry (collected slurry) discharged from a system consisting of a polisher and a slurry tank contains wash water and a used abrasive slurry.

In the foreign substance removal process, foreign substances such as a polish pad is removed through a filter of 20 to 100 μm.

Solution Process

Figure 2:
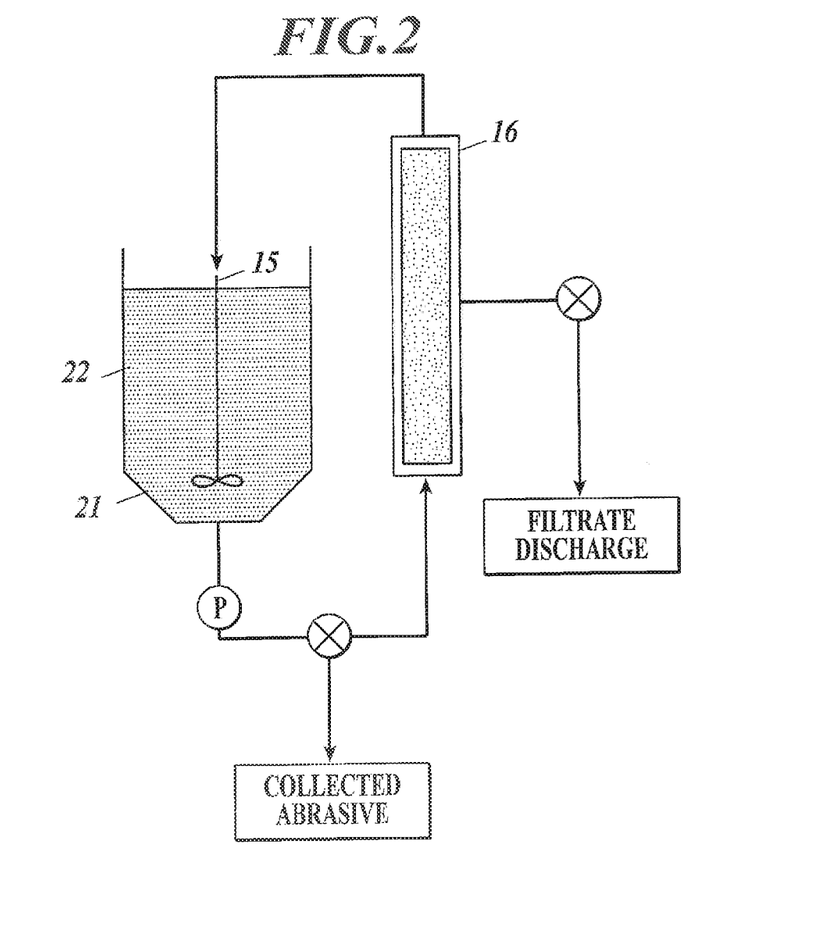
FIG. 2 is a schematic diagram illustrating an example of a filtration apparatus which collects an abrasive from a collected slurry.

After foreign substances are removed from a collected slurry 22 in the foreign substance removal process, the collected slurry 22 is brought into a tank 21 in a filtration apparatus having a temperature adjuster (see FIG. 2).

Preferably, components are analyzed through ICP Atomic Emission Spectrometry to check components of a polished object in the collected slurry, for example, silica concentration. Since the content of components of the polished object is given by component analysis, the amount of a solvent to be added can be adjusted. Also, the number of times the solution process and the filtration process are repeated can be adjusted.

After the concentration of components of the polished object is checked, a solvent is added to the collected slurry. The polished object is dissolved through stirring by a stirrer 15.

Preferably, the amount of a solvent to be added is adjusted in accordance with the concentration of components of a polished object contained in the abrasive slurry. More preferably, the amount of a solvent added to the abrasive slurry is adjusted such that the concentration of the solvent is, at the most, 1.8 times the saturation concentration of the polished object.

It was found that, when the concentration is, at the most, 1.8 times the saturation concentration of the polished object, a collected abrasive is reusable.

Preferably, the collected slurry is heated in the tank. More preferably, it is heated to a range between 40° C. and 90° C.

Components of the polished object is dissolved by addition of a solvent and also, according to circumstances, by heating. On the other hand, since components of the abrasive do not dissolve in the solvent, they can be separated through filtration.

The solvent to be added is water. A small amount of solvent that does not contain a metal ion, such as acetone, ethanol, methanol, ethylene glycol and propylene glycol, may be added.

Filtration Process

After the components of the polished object is dissolved in the collected slurry in the solution process, the collected slurry is filtered through a filter 16. After filtration, filtrate in which the components of the polished object is dissolved is discharged. A disperse liquid in which the abrasive is dispersed is collected through the concentration process.

The filter used in filtration is not particularly limited. Examples include hollow fiber filters, metal filters, wind filters, ceramic filters and roll-type polypropylene filters.

Preferable examples of ceramic filters employable in the present invention include ceramic filters manufactured by TAMI Industries (France), ceramic filters manufactured by NORITAKE CO., LIMITED and ceramic filters manufactured by NGK INSULATORS, LTD. (e.g., CERALLEC DPF and Cefilt).

Preferably, the filtration process is carried out before the solution process so that the solution process is carried out after the filtrate is separated. Thereby the components of the polished object are efficiently removed.

Repeated Solution Process

A repeated solution process in which the solution process and the filtration process are repeatedly carried out is also preferable. The repeated solution process, in which the solution process and the filtration process are repeatedly carried out, may be carried out after the foreign substance removal process and the filtration process.

Preferably, the amount of the solvent added to the abrasive slurry is adjusted such that the concentration of the components of the polished object is, at the most, 1.8 times the saturation solubility of the polished object.

More specifically, preferably, the amount of the solvent to be added is adjusted in all the processes such that it is, at the most, 1.8 times the saturation solubility at the temperature of silica in each process. More preferably, the amount of the solvent to be added is adjusted such that it does not exceed the saturation solubility. As a method for adjusting the amount of solution, heating is also preferable.

Being, at the most, 1.8 times the saturation concentration of the polished object means that components dissolved and dispersed in the solvent is, at the most, 1.8 times the saturation solubility of the polished object at each temperature. When it is 1.8 times the saturation solubility at the most, the components of the polished object dispersed in the solvent tend to keep a dispersed state instead of an aggregated state, and thereby efficiency of separation and purification is improved.

Concentration Process

After the filtration process including the repeated solution process, concentration is carried out such that the concentration of the abrasive comes to a desired concentration in a range between 1% by mass and 40% by mass.

By setting the concentration of the abrasive to 1% by mass or more, the abrasive can have a high ability of abrasion. By setting the concentration of the abrasive to 40% by mass or less, the abrasive does not get caught in a filter and can be regenerated as an abrasive slurry with an appropriate concentration.

The filter 16 used in the filtration process can be used in this process.

Through the above processes, a collected abrasive slurry can be reused as a collected abrasive.

Abrasive

Generally, fine particles of Bengala ($\alpha$ $Fe_2O_3$), cerium oxide, aluminum oxide, manganese oxide and/or zirconium oxide, or colloidal silica is dispersed as an abrasive in water or oil to form a slurry, and it is used for polishing optical glasses, semiconductor substrates and the like.

The method of the present invention for collecting an abrasive is preferably applied to collection of an abrasive which is selected from the group consisting of diamond, boron nitride, silicon carbide, alumina, alumina-zirconia and zirconium oxide. These abrasives are applicable to Chemical Mechanical Polishing (CMP). CMP utilizes mechanical and chemical actions and achieves sufficient speed and highly fine flatness in polishing the surface of a semiconductor substrate or a glass.

In the present invention, as a diamond abrasive, for example, a synthetic diamond and a natural diamond can be used. As a boron nitride abrasive, for example, a cubic crystal of boron nitride BN (for example, the one made by Showa Denko K. K.) can be used. A boron nitride abrasive is the next hardest abrasive after a diamond. As a silicon carbide abrasive, silicon carbide, green silicon carbide, black silicon carbide, etc. can be used. As an alumina abrasive, alumina, brown alumina, white alumina, pink alumina, broken alumina, alumina-zirconia, etc. can be used. As zirconium oxide, for example, BR series of zirconium oxide for an abrasive, which is made by Daiichi Kigenso Kagaku Kogyo Co., Ltd. can be used.

The composition and shape of an abrasive used in the present invention is not particularly limited. A commercially available abrasive can be used as an abrasive in the present invention. Preferably, the content of abrasive component is 50% by mass or more to achieve the effects of the present invention more sufficiently.

EXAMPLES

The present invention will now be described in detail with reference to Examples, but the present invention is not limited thereto. The percent sign "%" in the following description means "% by mass" unless described otherwise. Actual values of saturated solubility of silica in an abrasive slurry at various temperatures are shown in Table 1. This abrasive slurry is collected as a used slurry after being used for polishing a polished object that contains silicon as a main component.

TABLE 1

| TEMPARATURE (° C.) | SATURATION SOLUBILITY (mg/L) |
| --- | --- |
| 15 | 52 |
| 20 | 60 |
| 40 | 80 |
| 60 | 102 |
| 80 | 135 |
| 90 | 150 |
| 95 | 155 |
| 20 (NaOH) | 90 |
| 40 (NaOH) | 120 |

Preparation of Collected Abrasive
Preparation of Collected Abrasive 101

After a lens was polished with cerium oxide as an abrasive in the polish process shown in FIG. 1, 100 L of an abrasive slurry including wash water and a used abrasive was collected as a collected slurry. Concerning the collected slurry, cerium concentration was 10000 mg/L, silica concentration was 1000 mg/L, liquid temperature was 15° C., and pH was 7.5. The collected slurry will be referred to as "used sample 1" hereinafter.

1) Foreign Substance Removal Process

Foreign substances, such as a pad, were removed through a filter of 20 µm from the collected slurry.

2) Si Concentration Measurement Process (Component Analysis using ICP Atomic Emission Spectrometry)

The concentrations of a characteristic abrasive component, a glass component (Si) and a metal component except for the characteristic abrasive component in each sample from the collected slurry were measured using ICP Atomic Emission Spectrometry. Specific steps are described below.

Preparation of Sample Solution A (a) after 10 g of the collected slurry was diluted with 90 ml of pure water, 1 ml of a sample was taken from the un-treated collected slurry or the supernatant being stirred using a stirrer (b) 5 ml of hydrofluoric acid for atomic absorption was added to the sample (c) silica was eluted by ultrasonic dispersion (d) the sample was left to stand at room temperature for 30 minutes (e) ultrapure water was added to the sample to obtain a volume of 50 ml Each sample liquid prepared through the above steps is called the sample liquid A.

Quantification of Si
(a) the sample liquid A was filtrated using a membrane filter (hydrophilic PTFE)
(b) the filtrate was subjected to measurement using an Inductivity Coupled Plasma Atomic Emission spectrometer (ICP-AES)
(c) Si was quantified through a standard addition method Quantification of a characteristic abrasive element
(a) 5 ml of a sample was taken from the sample liquid in a well dispersing state
(b) 5 ml of high-purity sulfuric acid was added to the above taken sample
(c) ultrapure water was added to the resulting sample to obtain a volume of 50 ml
(d) the resulting sample was diluted as needed and subjected to measurement using ICP-AES
(e) each characteristic abrasive element was quantified through a calibration-curve method using matrix matching ICP Atomic Emission spectrometer
An ICP-AES manufactured by SII nanotechnology Inc. was used.

3) Solvent Addition Process and Solution Process

After foreign substances were removed in the foreign substance removal process, the collected slurry was brought into a tank in a filtration apparatus having a temperature adjuster.

Then, a solvent was added, and the collected slurry was stirred.

4) Filtration Process

The collected slurry was filtered through a ceramic filter to remove a silica component.

Specifically, the concentrate was passed through the filter to separate a dissolved component including a glass component as a filtrate.

The separated filtrate was discharged to the outside of the system through a pipe. In the filtration, the concentrate was circulated through the filtration device at a flow rate of 1.2 L/min until the concentration rate of the concentrate becomes a specified value as compared to the initial liquid amount of a used slurry.

As the filter, a ceramic filter "Cefilt" (pore size: 0.8 μm) manufactured by NGK INSULATORS, LTD. was used.

5) Concentration Process

The collected slurry was filtered with the filter used in the filtration process so that the concentration of the abrasive became 40% by mass or less. Thus the "collected abrasive 101" was prepared.

Preparation of Collected Abrasives 102 to 114

Collected abrasives 102 to 114 were prepared in the same manner as the collected abrasive 101 except that the temperature in the solution process and the total amount of the added solvent were changed as shown in Table 2.

Preparation of Collected Abrasive 115

After a lens was polished with cerium oxide as an abrasive in the polish process shown in FIG. 1, 100 L of an abrasive slurry including wash water and a used abrasive was collected as a collected slurry. Concerning the collected slurry, cerium concentration was 10000 mg/L, silica concentration was 200 mg/L, liquid temperature was 15° C., and pH was 7.5. The collected slurry will be referred to as "used sample 2" hereinafter.

Other processes for collection were the same as those for the collected abrasive 101.

Preparation of Collected Abrasives 116 to 119

Collected abrasives 116 to 119 were prepared in the same manner as the collected abrasive 115 except that the temperature in the solution process and the total amount of the added solvent were changed as shown in Table 2.

Preparation of Collected Abrasive 120

The collected abrasive 120 was prepared in the same manner as the collected abrasive 115 except that a solvent was not added in the solution process and in the filtration process and that sodium hydroxide as a pH adjuster was added in the solution process. As shown in Table 1, as a result of addition of the pH adjuster, the solubility in the solution process is different from that of other collected abrasives.

Preparation of Collected Abrasive 121

The collected abrasive 121 was prepared in the same manner as the collected abrasive 120 except that a solvent was added in the solution process and in the filtration process.

Preparation of Collected Abrasives 122 to 127

Collected abrasives 122 to 127 were prepared in the same manner as the collected abrasive 101 except that the temperature in the solution process and the total amount of the added solvent were changed as shown in Table 2.

TABLE 2

| COLLECTED ABRASIVE NO. | SAMPLE USED | HEATING | TEMPERATURE AFTER HEATING (° C.) | SOLUBILITY IN SOLUTION PROCESS (mg/L) | TOTAL AMOUNT OF ADDED SOLVENT (L) | pH ADJUSTMENT |
|---|---|---|---|---|---|---|
| 101 | 1 | NO | 15 | 52 | 2000 | NO |
| 102 | 1 | DONE | 20 | 60 | 2000 | NO |
| 103 | 1 | DONE | 40 | 80 | 2000 | NO |
| 104 | 1 | DONE | 60 | 102 | 2000 | NO |
| 105 | 1 | DONE | 80 | 135 | 2000 | NO |
| 106 | 1 | DONE | 90 | 150 | 2000 | NO |
| 107 | 1 | DONE | 95 | 155 | 2000 | NO |
| 108 | 1 | NO | 15 | 52 | 1000 | NO |
| 109 | 1 | DONE | 20 | 60 | 1000 | NO |
| 110 | 1 | DONE | 40 | 80 | 1000 | NO |
| 111 | 1 | DONE | 60 | 102 | 1000 | NO |
| 112 | 1 | DONE | 80 | 135 | 1000 | NO |
| 113 | 1 | DONE | 90 | 150 | 1000 | NO |
| 114 | 1 | DONE | 95 | 155 | 1000 | NO |
| 115 | 2 | NO | 15 | 52 | 200 | NO |
| 116 | 2 | DONE | 20 | 60 | 200 | NO |
| 117 | 2 | DONE | 40 | 80 | 200 | NO |

TABLE 2-continued

| | | | | | | |
|---|---|---|---|---|---|---|
| 118 | 2 | DONE | 60 | 102 | 200 | NO |
| 119 | 2 | DONE | 80 | 135 | 200 | NO |
| 120 | 2 | DONE | 20 | 90 | 0 | NaOH |
| 121 | 2 | DONE | 40 | 120 | 1000 | NaOH |
| 122 | 1 | DONE | 40 | 80 | 600 | NO |
| 123 | 1 | DONE | 60 | 102 | 600 | NO |
| 124 | 1 | DONE | 80 | 135 | 600 | NO |
| 125 | 1 | DONE | 40 | 80 | 300 | NO |
| 126 | 1 | DONE | 60 | 102 | 300 | NO |
| 127 | 1 | DONE | 80 | 135 | 200 | NO |

| COLLECTED ABRASIVE NO. | DISPERSION CONCENTRATION AGAINST SATURATION SOLUBILITY (%) | Si PERCENTAGE IN SLURRY AFTER COLLECTION PROCESS | EVALUATION 1 | EVALUATION 2 | NOTE |
|---|---|---|---|---|---|
| 101 | 0.64 | 0 | ◎ | ○ | INVENTION |
| 102 | 0.79 | 0 | ◎ | ○ | INVENTION |
| 103 | 0.60 | 0 | ◎ | ○ | INVENTION |
| 104 | 0.47 | 0 | ◎ | ○ | INVENTION |
| 105 | 0.35 | 0 | ◎ | ○ | INVENTION |
| 106 | 0.32 | 0 | ◎ | ○ | INVENTION |
| 107 | 0.31 | 0 | ◎ | ○ | INVENTION |
| 108 | 1.75 | 43 | ○ | ○ | INVENTION |
| 109 | 1.52 | 35 | ○ | ○ | INVENTION |
| 110 | 1.14 | 13 | ○ | ○ | INVENTION |
| 111 | 0.89 | 1 | ◎ | ○ | INVENTION |
| 112 | 0.68 | 1 | ◎ | ○ | INVENTION |
| 113 | 0.61 | 1 | ◎ | ○ | INVENTION |
| 114 | 0.59 | 1 | ◎ | ○ | INVENTION |
| 115 | 1.28 | 25 | ○ | ○ | INVENTION |
| 116 | 1.11 | 13 | ○ | ○ | INVENTION |
| 117 | 0.83 | 3 | ◎ | ○ | INVENTION |
| 118 | 0.65 | 3 | ◎ | ○ | INVENTION |
| 119 | 0.50 | 3 | ◎ | ○ | INVENTION |
| 120 | 2.22 | 60 | Δ | X | COMPARISON |
| 121 | 0.15 | 0 | ◎ | X | COMPARISON |
| 122 | 1.79 | 45 | ○ | ○ | INVENTION |
| 123 | 1.40 | 30 | ○ | ○ | INVENTION |
| 124 | 1.06 | 7 | ◎ | ○ | INVENTION |
| 125 | 3.13 | 69 | Δ | ○ | INVENTION |
| 126 | 2.45 | 60 | Δ | ○ | INVENTION |
| 127 | 2.48 | 61 | Δ | ○ | INVENTION |

Evaluation of Collected Abrasive
Evaluation of Purity of Collected Abrasive 1

Concerning components of collected abrasives 101 to 127, the collection rate (%) of silica contained in a collected abrasive was analyzed with an ICP Atomic Emission Spectrometry analyzation apparatus in the following manner.

Evaluation is as follows.

◎: collection rate of components of the polished object is 10% by mass or less

○: collection rate of components of the polished object is more than 10% by mass but no more than 50% by mass Δ: collection rate of components of the polished object is more than 50% by mass but no more than 80% by mass x: collection rate of components of the polished object is more than 80% by mass Evaluation of Purity of Collected Abrasive 2

In the same manner as Evaluation of Purity of Collected Abrasive 1, metal components in collected abrasives 101 to 127 other than characteristic abrasive components were analyzed with an ICP Atomic Emission Spectrometry analyzation apparatus. The concentrations of metal components other than characteristic abrasive components in the collected abrasive after collection were compared with those in the collected slurry before collection (abrasive slurry that contains wash water and a used abrasive). The collection was carried out in the method of the present invention for collecting an abrasive. Evaluation is as follows.

○: concentration of metal components other than characteristic abrasive components in the collected abrasive is less than 10 mg/L x: concentration of metal components other than characteristic abrasive components in the collected abrasive is 10 mg/L or more The evaluation revealed that the percentage of silica, which is a component of a polished object, in the collected abrasive which is a collected slurry collected in the method of the present invention for collecting an abrasive is lower than that in the collected abrasive of examples for comparison. Foreign substances are not mixed in the collected abrasive. The collected abrasive can be used as a regenerated abrasive.

Although embodiments of the present invention have been described and illustrated in detail, it is clearly understood that the same is by way of illustration and example only and not limitation, the scope of the present invention should be interpreted by terms of the appended claims.

INDUSTRIAL APPLICABILITY

The method of the present invention for collecting an abrasive can be suitably used as a simple method for collecting a highly pure abrasive which is used as an optical abrasive for a mirror finish of electronic parts, such as an optical lens, a semiconductor silicon substrate, a crystal wafer and a glass plate of a liquid crystal screen.

DESCRIPTION OF REFERENCE SIGNS

1 Abrader
2 Abrasive surface plate
3 Polished object
4 Abrasive liquid
5 Slurry nozzle
6 Flow pass
7 Wash water
8 Wash water-spraying nozzle
9 Flow pass
10 Abrasive-containing wash liquid
15 Stirrer
16 Filter
21 Tank
22 Collected slurry
D Pump
K Abrasive cloth
N Pressure force
H Holder
T1 Slurry tank
T2 Wash water tank
T3 Wash liquid tank

The invention claimed is:

1. is allowable over the prior art of record because the teachings of the references taken as a whole do not show or render obvious the combination set forth, including: (1) A method for collecting an abrasive from an abrasive slurry which has been used for polishing an object including silicon as a main component, the method at least comprising: (i) adding a solvent to the abrasive slurry, the abrasive slurry comprising an abrasive, components of the polished object, and a liquid; (ii) dissolving particles of the polished object among the components of the polished object contained in the abrasive slurry; and (iii) filtering the abrasive slurry to separate a filtrate from a concentrate; and (iv) collecting the concentrate to collect the abrasive, wherein the steps (i) to (iii) are carried out without a pH adjuster to remove the components of the polished object to collect the abrasive; and wherein adjusting an amount of the solvent added in the steps (i) and (ii) is adjusted in accordance with the concentration of the components of the polished object contained in the abrasive slurry; and (vi) analyzing the abrasive slurry prior to step (i) for a concentration of components of the polished object in the abrasive slurry which is used for polishing an object.

2. The method according to claim 1, wherein the solvent is added to the abrasive slurry so that the concentration of the components of the polished object becomes, at the most, 1.8 times a saturation solubility of the polished object.

3. The method according to claim 1, wherein, in the step (ii), heating is carried out after the solvent is added to the abrasive slurry.

4. The method according to claim 3, wherein the heating is carried out so that a temperature of the abrasive slurry comes within a range between 40° C. and 90° C.

5. The method according to claim 1, wherein the liquid comprises a liquid used for washing the object after polishing the object.

6. The method according to claim 1, wherein the liquid comprises a liquid added to the abrasive slurry before polishing the object.

7. The method according to claim 1, wherein the abrasive slurry in the step (i) is obtained directly after polishing the object without subjecting the abrasive slurry to any other steps.

8. The method according to claim 1, wherein the abrasive slurry in the step (i) is obtained directly after polishing the object and subjecting the abrasive slurry to a filtration step with a filter of 20 to 100 μm.

* * * * *